Oct. 13, 1931.  A. H. KROGAN  1,826,891
CUTTER
Filed Jan. 17, 1929  2 Sheets-Sheet 1

A. H. Krogan, Inventor
By C. A. Snow & Co.
Attorneys.

Oct. 13, 1931.  A. H. KROGAN  1,826,891
CUTTER
Filed Jan. 17, 1929  2 Sheets-Sheet 2
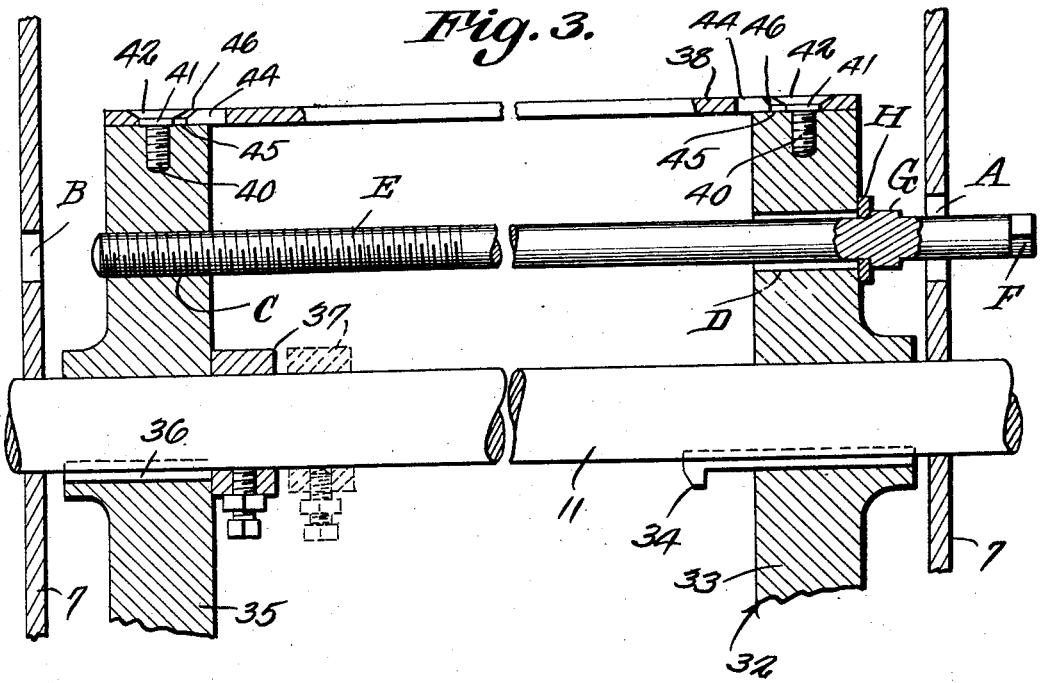
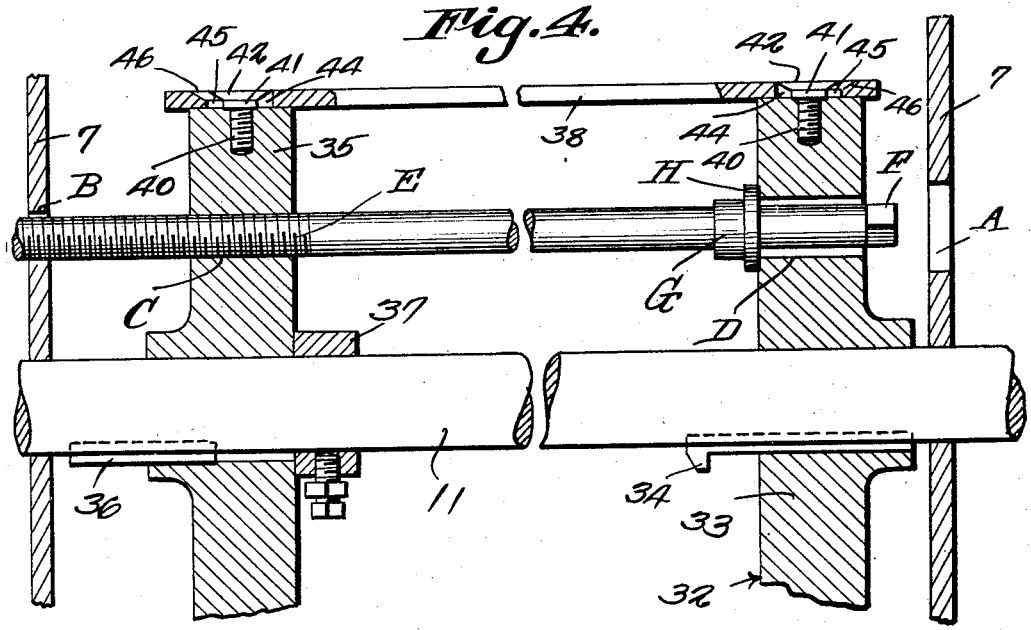
A. H. Krogan
Inventor
By C.A.Snow&Co.
Attorneys.

Patented Oct. 13, 1931

1,826,891

UNITED STATES PATENT OFFICE

ABNER H. KROGAN, OF STANLEY, WISCONSIN

CUTTER

Application filed January 17, 1929. Serial No. 333,079.

My patent No. 1,683,042, issued on September 4, 1928, shows a device for gathering corn and cutting it into ensilage, the device comprising a rotary cutter. The cutter, in its turn, is made up of a fixed head, a head adjustable toward and away from the fixed head, blades extended between the heads, and inter-engaging elements on the heads and on the blades, so constructed that the blades will be connected to the heads when the adjustable head is moved toward and away from the fixed head.

The foregoing construction being understood, it may be stated that the object of this invention is to provide a novel means for moving the adjustable head toward and away from the fixed head, as and for the purpose mentioned.

It is within the province of the disclosure to improve generally and to enhance the utility of devices of that type to which the invention appertains.

With the above and other objects in view, which will appear as the description proceeds, the invention resides in the combination and arrangement of parts and in the details of of construction hereinafter described and claimed, it being understood that, within the scope of what is claimed, changes in the precise embodiment of the invention shown can be made without departing from the spirit of the invention.

In the accompanying drawings:—

Figure 3 is a sectional view showing the rotary cutter with the parts arranged as they will appear when the movable head is to be drawn toward the fixed head;

Figure 4 is a sectional view of the rotary cutter showing the parts as they will appear when the movable head is to be shoved away from the fixed head.

Figure 1:
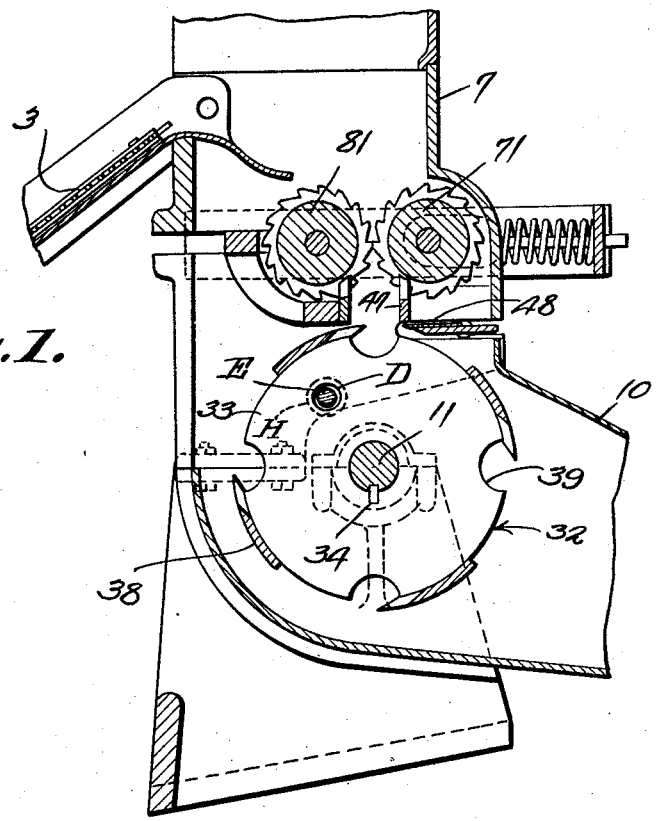
Figure 1 shows in vertical section a device wherein my invention has been embodied.
Figure 2:
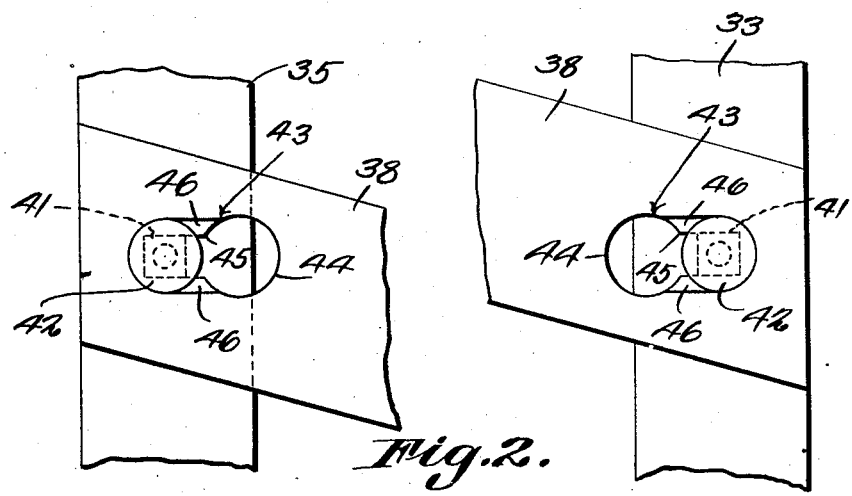
Figure 2 is a plan showing the heads, one of the blades, and the connections between the blade and the heads.

In the drawings there appear some parts which are shown in my Patent No. 1,683,042. Those parts are designated by numerals used in the patent. The old structure will be described first, and notice will be given when the description passes from that which is old to that which is new.

In Figure 1, the numeral 3 indicates mechanism whereby corn, having been cut in the field, is carried into a casing 7. The corn, having been received in the casing 7, is engaged by feed rolls 71 and 81 and is carried downwardly upon a fixed shear 47 and a blade 48 in the casing 7. The ensilage is severed to the proper size by a rotary cutter 32 carried by a shaft 11 that is journaled in the casing 7 and supported additionally, if desired. The rotary cutter 32 includes blades 38 which cooperate with the fixed shear 47 and with the blade 48 to cut up the corn into ensilage, and after the corn has been cut up as aforesaid, it passes away through a chute 10. The rotary cutter 32 comprises a head 33 which is secured and fixed to the shaft 11 by means of a key 34. A head 35 is adjustable lengthwise of the shaft 11, and is connected by a key 36, or the like, to the shaft 11 to rotate therewith. Movement of the head 35 toward the head 33 is restrained by a set collar 37 which may be adjusted along the shaft 11. The ends of the cutting blades 38 are mounted on the peripheries of the heads 33 and 35, and, as shown in Figure 1, the said heads have peripheral clearance recesses 39 adjacent to the cutting edges of the blades. Securing elements 40, such as screws, are mounted in the edges of the heads 33 and 35, the securing elements having necks 41 which are rectangular in cross section, the securing elements including enlarged heads 42.

There are key-hole slots 43 in the end portions of the blades 38, each key-hole slot including an enlarged part 44 and a reduced part 45.

The set collar 37 is loosened, the head 35 is slid a little way toward the head 33, the enlarged parts 42 of the securing elements 40 are passed through the enlarged parts 44 of the key-hole slots 43 in the blades 38, the head 35 is moved to the left in Figure 4 until the polygonal necks 41 of the securing elements 40 are received in the reduced parts 45 of the key-hole slots 43 in the blades 38, and when the set collar 37 is secured in place on the shaft 11, the blades 38 will be held in place on the edges of the heads 33 and 35. The blades 38 are recessed, as at 46, lengthwise, to accommodate the heads 42 of the securing elements 40 when the necks 41 of the securing elements are received in the reduced parts 45 of the key-hole slots 43. Because the necks 41 of the securing elements 40 are held against rotation in the reduced parts 45 of the key-hole slots 43, the securing elements cannot thread out of the heads 33 and 35.

The parts hereinbefore alluded to are shown in my Patent No. 1,683,042, and no novelty is claimed for them, saving in so far as they may enter into combination with parts hereinafter described.

In carrying out the invention, a hole A is formed in one side of the casing 7, as disclosed in Figure 3, there being a hole B in the opposite side of the casing. The hole B preferably is a little smaller than the hole A. There is a threaded opening C in the head 35, and a smoooth opening D is formed in the head 33, the openings C and D being coaxial. A screw E extends through the opening D of the head 33 and is threaded into the opening C of the head 35. The screw E has a squared end F by which it may be rotated conveniently, although some may wish to substitute any suitable mechanical equivalent for the part F. The screw E has a shoulder G of such size that it can pass through the opening D in the head 33. The letter H indicates a movable abutment, such as a washer, mounted on the screw E and interposed, in Figure 3, between the shoulder G and the outer surface of the head 33. When the parts are arranged as shown in Figure 3, and when the screw E is turned, the head 35 will be drawn toward the head 33, the set collar 37 having been loosened. The screw E can be remounted in place, as shown in Figure 4, with the shoulder G on the inside of the head 33, the abutment H being interposed between the shoulder D and the inner surface of the head 33. The screw E now may be rotated to shove the head 35 to the left in Figure 4. It has been stated hereinbefore that movement of the head 35 toward and away from the head 33 is necessary in order that the securing elements 40 may cooperate properly with the key-hole slots 43, to hold the blades 38 on the heads 33 and 35.

The screw E, of course, constitutes a means whereby the head 35 can be adjusted toward and away from the head 33, as aforesaid. The hole B is to receive the screw E when the screw is advanced, as shown in Figure 4.

When the screw E is in the position of Figure 3, it can be moved longitudinally to the right, and be removed through the hole A. When the screw E is in the position of Figure 4, it can be moved far enough to the left so that the end F is between the heads 35 and 33, and spaced from the head 33, whereby the abutment H can be slipped off the part F of the screw and removed through any of the spaces (Figure 1) between the blades 38. Then the screw E can be removed to the right through the opening D and the hole A. The screw E, therefore, need never interfere with tht rotation of the cutter.

Having thus described the invention, what is claimed is:—

1. In a device of the class described, a cutter comprising a shaft, a head fixed on the shaft, a head adjustable on the shaft toward and away from the fixed head, a blade extended between the heads, interengaging elements on the blade and on the heads whereby the blade will be secured to the heads when the adjustable head is moved toward and away from the fixed head, and mechanism mounted in the heads and accessible from a point external to one head for moving the adjustable head toward and away from the fixed head.

2. In a device of the class described, a cutter comprising a shaft, a head fixed on the shaft, a head adjustable on the shaft toward and away from the fixed head, a blade extended between the heads, interengaging elements on the blade and on the heads whereby the blade will be secured to the heads when the adjustable head is moved toward and away from the fixed head, and mechanism for moving the adjustable head toward and away from the fixed head, said mechanism comprising a screw threaded into the adjustable head and having a shoulder, the fixed head having an opening through which the screw extends, the opening being large enough to permit the passage of the shoulder, and a movable abutment of larger size than the opening and mounted on the screw between the shoulder and the fixed head.

In testimony that I claim the foregoing as my own, I have hereto affixed my signature.

ABNER H. KROGAN.